US008429269B2

(12) United States Patent
Kutner

(10) Patent No.: US 8,429,269 B2
(45) Date of Patent: Apr. 23, 2013

(54) SERVER-SIDE RENDERING

(75) Inventor: Michael Alan Kutner, Mountain View, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 689 days.

(21) Appl. No.: 12/634,570

(22) Filed: Dec. 9, 2009

(65) Prior Publication Data

US 2011/0138072 A1    Jun. 9, 2011

(51) Int. Cl.
*G06F 15/173* (2006.01)
(52) U.S. Cl.
USPC .............................. 709/224; 709/219; 436/42
(58) Field of Classification Search .................... 463/42, 463/3, 7; 345/156; 375/240.07; 702/142; 709/224, 219
See application file for complete search history.

(56) References Cited

U.S. PATENT DOCUMENTS

| 7,627,139 | B2 | 12/2009 | Marks et al. | |
|---|---|---|---|---|
| 7,675,519 | B2 | 3/2010 | Tobias | |
| 7,680,038 | B1 | 3/2010 | Gourlay | |
| 2003/0027637 | A1* | 2/2003 | Sato | 463/42 |
| 2007/0010329 | A1* | 1/2007 | Craig et al. | 463/42 |
| 2007/0183493 | A1 | 8/2007 | Kimpe et al. | |
| 2008/0183801 | A1 | 7/2008 | Marton et al. | |
| 2008/0280685 | A1* | 11/2008 | Hansen et al. | 463/42 |
| 2009/0165043 | A1 | 6/2009 | Ou et al. | |
| 2009/0273559 | A1* | 11/2009 | Rofougaran et al. | 345/156 |
| 2010/0166064 | A1* | 7/2010 | Perlman et al. | 375/240.07 |
| 2011/0077899 | A1* | 3/2011 | Hayashi et al. | 702/142 |
| 2011/0124385 | A1* | 5/2011 | Otomo et al. | 463/3 |
| 2011/0124387 | A1* | 5/2011 | Sauerbrei et al. | 463/7 |

OTHER PUBLICATIONS

International Search Report and Written Opinion in International Application No. PCT/US10/55185, mailed Dec. 30, 2010.

* cited by examiner

*Primary Examiner* — Le H Luu
(74) *Attorney, Agent, or Firm* — Nixon Peabody LLP; Khaled Shami

(57) ABSTRACT

A solution for server-side rendering includes, at a server configured to store a video images representing states of users in a computer application, identifying future user actions based at least in part on a state of a user in the computer application. The solution also includes, responsive to the identifying, rendering video images for sending to a user device associated with the user. At the user device, a state of the user in a computer application is sent to the server. Responsive to the sending, video images are stored, each of the video images representing a future state of the user after the user performs a future action. Responsive to a user action, one of the video images is selected for display on a user display of the user device. According to one aspect, the future user actions identified by the server are limited to less than a possible number of user actions for users having the state.

42 Claims, 7 Drawing Sheets

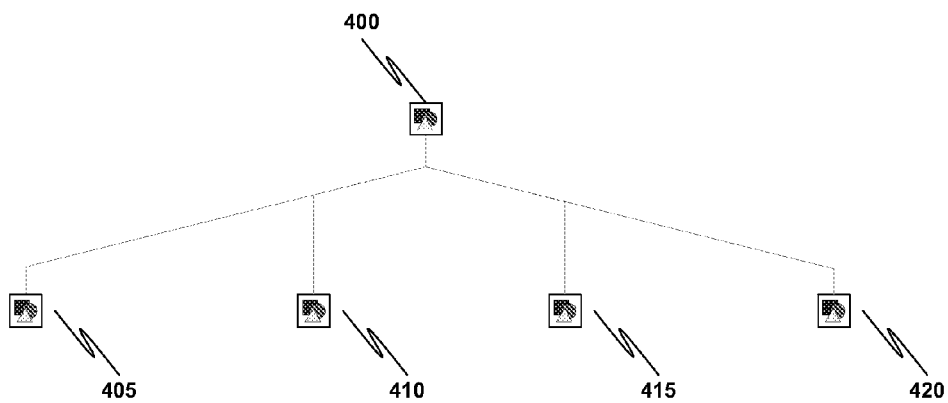
FIG. 4A
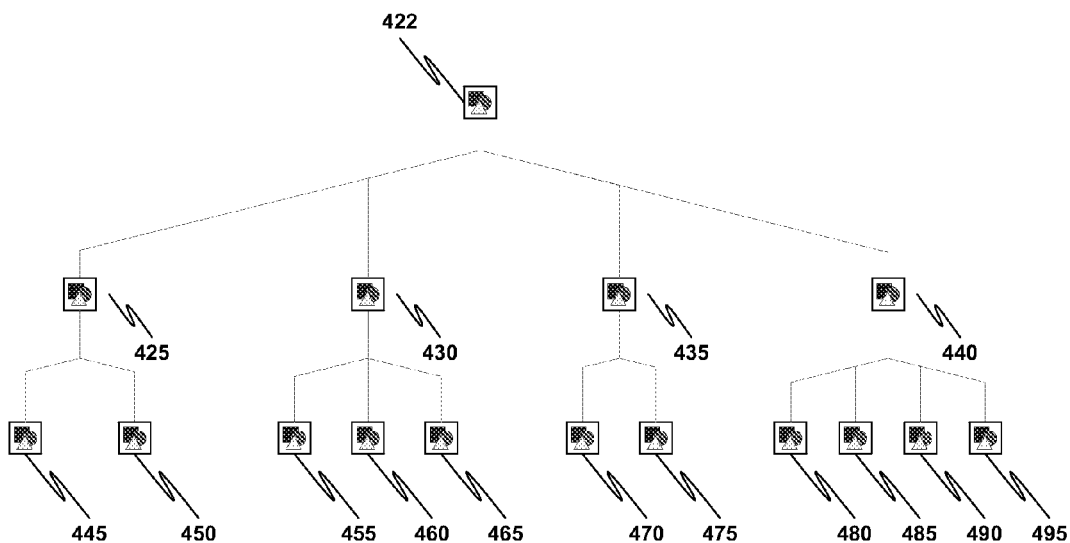
FIG. 4B
FIG. 4A-4B

SERVER-SIDE RENDERING

TECHNICAL FIELD

The present disclosure relates to server side rendering.

BACKGROUND

Online applications such as online gaming systems typically include a user device which communicates with a server computer over a network. A user provides input regarding a user action via a user input device such as a joystick. The input is communicated to the server, and the user input may determine in part the content of the video images subsequently displayed on a user display. For video images rendered on the server, there can be a noticeable delay between the computer game player's action and the display of a video image that reflects the result of the action. This delay may be caused for example by network conditions or the complexity of the rendition process.

Video images for online applications may also be rendered on a user device, but such solutions require that the user device have a relatively high performance graphics system, which adds to the cost of the user device. Accordingly, an improved solution for rendering video images to be displayed on user devices used in online applications would be desirable.

SUMMARY OF THE INVENTION

A solution for server-side rendering includes, at a server configured to store a video images representing states of users in a computer application, identifying future user actions based at least in part on a state of a user in the computer application. The solution also includes, responsive to the identifying, rendering video images for sending to a user device associated with the user. At the user device, a state of the user in a computer application is sent to the server. Responsive to the sending, video images are stored, each of the video images representing a future state of the user after the user performs a future action. Responsive to a user action, one of the video images is selected for display on a user display of the user device. According to one aspect, the future user actions identified by the server are limited to less than a possible number of user actions for users having the state.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 4A is a tree diagram that illustrates video images representing a user state following one future user action in accordance with one embodiment.

FIG. 4B is a tree diagram that illustrates video images representing a user state following two future user actions in accordance with one embodiment.

DETAILED DESCRIPTION

Figure 1:
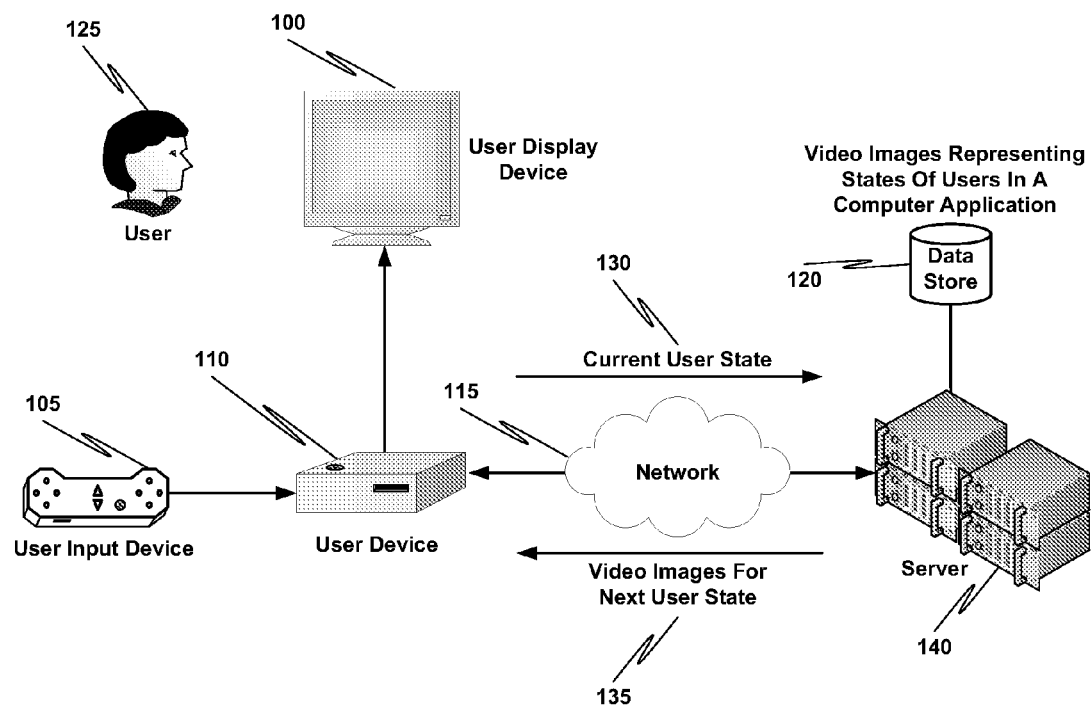
FIG. 1 is a block diagram that illustrates a system for server side rendering in accordance with one embodiment.

Embodiments of the present invention are described herein in the context of server side rendering. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

According to one embodiment, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment, the components, processes and/or data structures may be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows Vista™, Windows NT®, Windows XP, Windows XP PRO, and Windows® 2000, available from Microsoft Corporation of Redmond, Wash., Apple OS X-based systems, available from Apple Inc. of Cupertino, Calif., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general-purpose machines; and. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present invention, the term "network" includes local area networks (LANs), wide area networks (WANs), metro area networks, residential networks, corporate networks, inter-networks, the Internet, the World Wide Web, cable television systems, telephone systems, wireless telecommunications systems, fiber optic networks, token ring networks, Ethernet networks, ATM networks, frame relay networks, satellite communications systems, and the like. Such networks are well known in the art and consequently are not further described here.

In the context of the present invention, the term "identifier" describes an ordered series of one or more numbers, characters, symbols, or the like. More generally, an "identifier" describes any entity that can be represented by one or more bits.

In the context of the present invention, the term "distributed" describes a digital information system dispersed over multiple computers and not centralized at a single location.

In the context of the present invention, the term "processor" describes a physical computer (either stand-alone or distributed) or a virtual machine (either stand-alone or distributed) that processes or transforms data. The processor may be implemented in hardware, software, firmware, or a combination thereof.

In the context of the present invention, the term "data store" describes a hardware and/or software means or apparatus, either local or distributed, for storing digital or analog information or data. The term "Data store" describes, by way of example, any such devices as random access memory (RAM), read-only memory (ROM), dynamic random access memory (DRAM), static dynamic random access memory (SDRAM), Flash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "Data store" also describes, by way of example, databases, file systems, record systems, object oriented databases, relational databases, SQL databases, audit trails and logs, program memory, cache and buffers, and the like.

In the context of the present invention, the term "network interface" describes the means by which users access a network for the purposes of communicating across it or retrieving information from it.

In the context of the present invention, the term "system" describes any computer information and/or control device, devices or network of devices, of hardware and/or software, comprising processor means, data storage means, program means, and/or user interface means, which is adapted to communicate with the embodiments of the present invention, via one or more data networks or connections, and is adapted for use in conjunction with the embodiments of the present invention.

It should be noted that the server side rendering system is illustrated and discussed herein as having various modules which perform particular functions and interact with one another. It should be understood that these modules are merely segregated based on their function for the sake of description and represent computer hardware and/or executable software code which is stored on a computer-readable medium for execution by appropriate computing hardware. The various functions of the different modules and units can be combined or segregated as hardware and/or software stored on a computer-readable medium as above as modules in any manner, and can be used separately or in combination.

In Example embodiments of the present invention, a server computer renders the video images that result from user actions in an online computer application such as an online computer game. The video images are transmitted to a user device. The user device accepts input from a user, selects the appropriate video image, and displays that image. The user device also sends the computer application user action to the server. The image transmission method can be optimized for the network conditions by variable video compression. The tightness of the feedback from user device to server can be reduced by creating on the server a tree of possible future computer game-player actions and rendering video images several iterations into the future. The number of user actions in the online computer application may be limited to less than the number of possible user actions.

FIG. 1 is a block diagram that illustrates a system for server side rendering in accordance with one embodiment. As shown in FIG. 1, a system for server side rendering includes a user device 110 communicably coupled to server 140 via network 115. Server 140 is communicably coupled to data store 120, which is configured to store video images representing states of users in a computer application. One or more of the video images stored in data store 120 may be dynamically generated based at least in part on possible user states. User device 110 is configured to receive input from user 125 via user input device 105. User device 110 is configured to store a state of a user 125 in a computer application for sending (130) to server computer 140. User device 110 is further configured to receive and store in a memory one or more video images 135 that represent a future state of the user 125 after the user 125 performs a future action. User device 110 is further configured to, responsive to a user action, select one of the one or more video images for display on user display device 110. According to one embodiment, the number of future actions is limited to less than a possible number of future actions.

Still referring to FIG. 1, server 140 is configured to receive a current user state 130 indicating the state of user 125 in a computer application, and identify one or more future user actions based on the current user state 130. Server 140 is further configured to, based on the identification, render one or more video images and send the one or more video images to user device 110 via network 115. According to one embodiment, the one or more future user actions are limited to less than a possible number of user actions for users having the state.

According to one embodiment, the computer application comprises a computer game. According to one embodiment, the computer game comprises an online computer game.

According to one embodiment, server 140 is further configured to compress the video images 135 before sending them to user device 110, and user device 110 is further configured to decompress the video images 135 prior to displaying one of the video images on user display device 100.

According to one embodiment, the compressing comprises selecting an amount of compression based at least in part on a degree of network congestion between the server computer 140 and the user device 110. The selection of a particular compression method may take into account the amount of time required to perform the compression, and the expected amount of compression. For example, a relatively high level of compression may be selected during times of relatively high network congestion. Additionally, a relatively low level of compression may be selected during times of relatively low network congestion.

Figure 2:
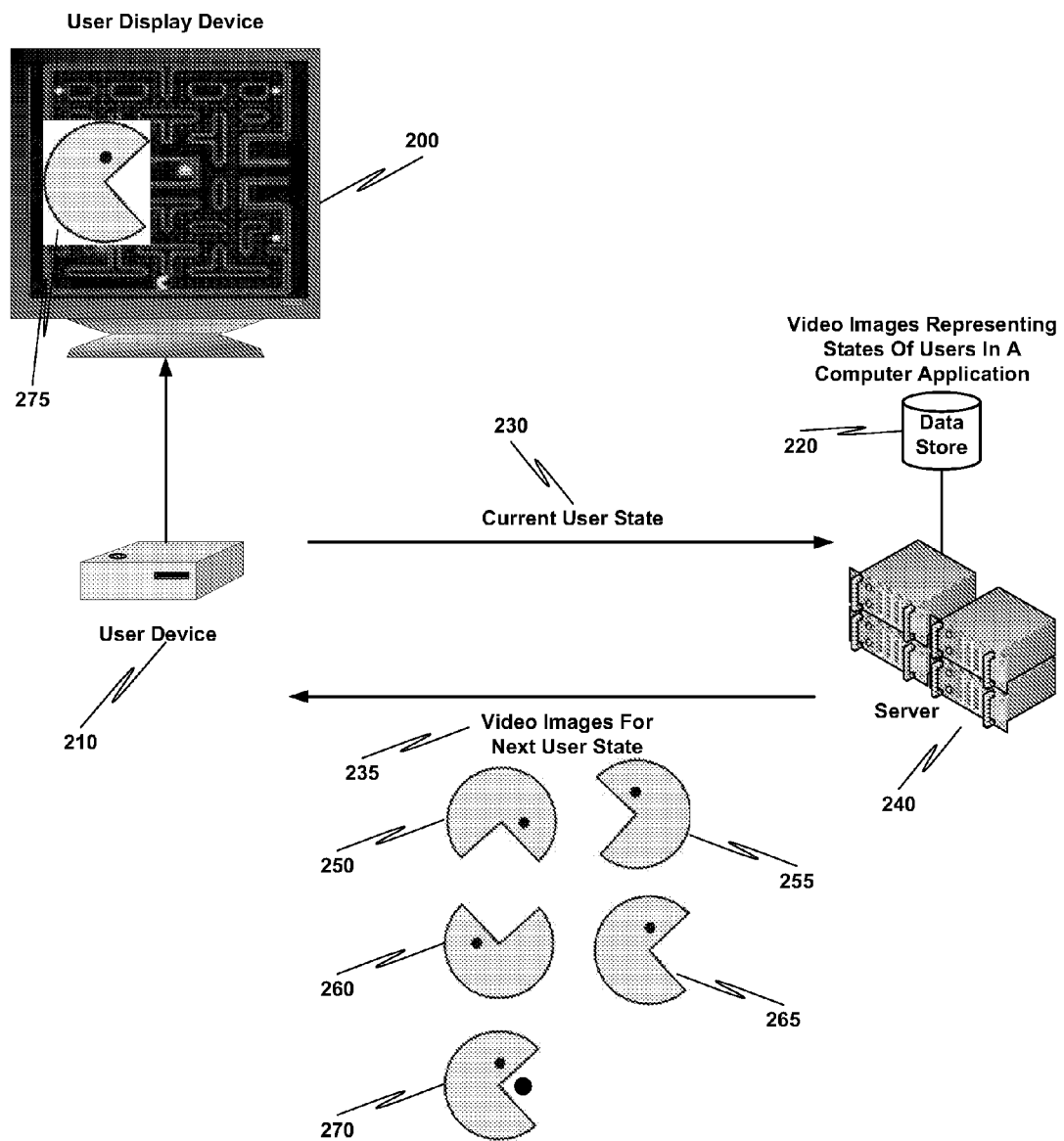
FIG. 2 is a block diagram that illustrates a system for server side rendering using images from a computer game manipulating a computer-generated character in accordance with one embodiment.

FIG. 2 is a block diagram that illustrates a system for server side rendering using images from a computer game manipulating a computer-generated character in accordance with one embodiment. FIG. 2 provides more detail for communications 130 and 135 in FIG. 1. An image representing a current state of a user is shown at reference numeral 275, indicating a right-facing character. At 230, an indication of the current user state indicated by reference numeral 275 is sent to server 240. Server 240 receives the indication of the current user state and renders video images for a next user state. The rendered video images 235 are extracted from data store 220.

As shown in the present example, the next user state could be represented by a video image of a downward-facing character 250, a left-facing character 255, an upwards-facing character 260, a right-facing character 265, or a right-facing character 270 ingesting a circular object. The user action subsequent to the sending of the current state 230 determines which of video images 250, 255, 260, 265, and 270 is actually selected by user device 210 and displayed on user device 200 to represent the new state resulting from the subsequent user action. Thus, if the user action indicates no change in direction, video image 265 is displayed. And if the user action indicates an upward direction, video image 260 is displayed. And if the user action indicates no change in direction while crossing the path of a circular object, video image 270 is displayed.

According to one embodiment, the number of future user actions is limited based at least in part on a probability of the future user actions. This is explained in more detail below with reference to FIG. 3.

Figure 3:
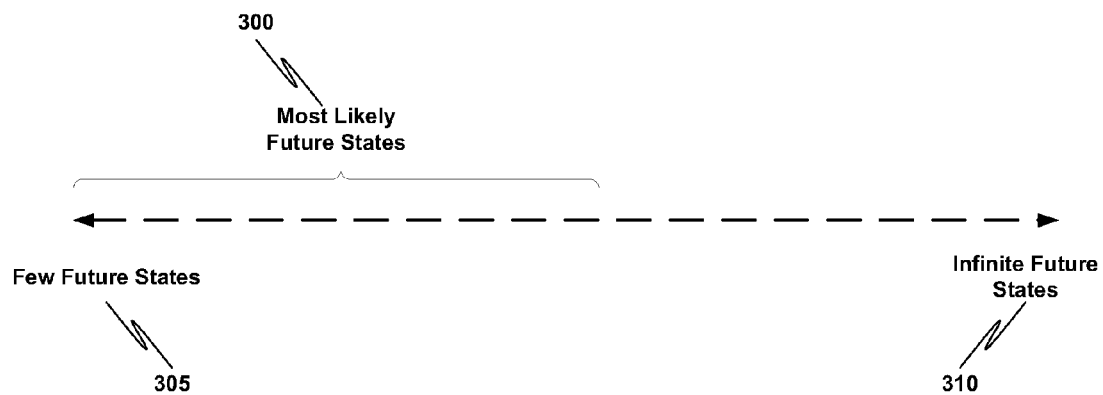
FIG. 3 is a diagram that illustrates limiting future moves to most likely future moves in accordance with one embodiment.

FIG. 3 is a diagram that illustrates limiting future moves to most likely future moves in accordance with one embodiment. As shown in FIG. 3, some user applications have relatively few future states (305), thus relatively few video images are required to represent the states. An example of such a user application is the video computer game illustrated in FIG. 2. Other user applications, such as airplane flight simulation user applications have a relatively large number of future states (310). According to one embodiment, the number of next states is limited to the most likely future states (300).

The determination of most likely future states may take into account previous actions of the user when in a particular state. For example, if a user in a state with possible user actions A, B, C, and D has never chosen action C in the past while in the same state, images resulting from user action C are not generated in the set of images sent from the server to the user device. In the event the user does in fact choose action C, the associated image may be generated by the user device in real-time, or requested from the server.

The determination of most likely future states may also take into account the previous actions of other users when in the particular state. For example, if more than a predetermined percentage of users in a state with possible user actions A, B, C, and D has never chosen action C in the past if a particular user is in the same state, images resulting from user action C are not generated in the set of images sent from the server to the user device. In the event the user does in fact choose action C, the associated image may be generated by the user device in real-time, or requested from the server.

FIG. 4A is a tree diagram that illustrates video images representing a user state following one future user action in accordance with one embodiment. Starting with current user state 400, the identification of a particular user action will determine a future user state (405, 410, 415, 420). Only four future user states are shown. Other numbers of future states are possible.

FIG. 4B is a tree diagram that illustrates video images representing a user state following two future user actions in accordance with one embodiment. Starting with current user state 422, the identification of a first user action will determine a first future user state (425, 430, 435, 440). If the first future user state is user state 425, the identification of a second user action will determine a second future state (445, 450). If the first future user state is user state 430, the identification of a second user action will determine a second future state (455, 460, 465). If the first future user state is user state 435, the identification of a second user action will determine a second future state (470, 475). If the first future user state is user state 440, the identification of a second user action will determine a second future state (480, 485, 490, 495).

FIGS. 4A and 4B show video images representing a user state following one and two future user actions, respectively. Video images representing a user state following more than two future user actions are possible as well.

According to one embodiment, the predetermined number of successive future user actions is based at least in part on a data store constraint of the server computer. For example, a relatively high number successive future user actions may be represented in a memory of the server computer if the amount of available memory is relatively high. And a relatively low number successive future user actions may be represented in a memory of the server computer if the amount of available memory is relatively low.

According to one embodiment, the predetermined number of successive future user actions is based at least in part on a data store constraint of the user device. For example, a relatively high number successive future user actions may be represented in a memory of the client device if the amount of available memory is relatively high. And a relatively low number successive future user actions may be represented in a memory of the client device if the amount of available memory is relatively low.

According to one embodiment, the predetermined number of successive future user actions is based at least in part on a network bandwidth constraint. For example, a relatively high number successive future user actions may be represented in a memory if the amount of available bandwidth is relatively high. And a relatively low number successive future user actions may be represented in a memory if the amount of available bandwidth is relatively low.

According to one embodiment, the predetermined number of successive future user actions is based at least in part on an amount of time required for the server computer to compress the video images. For example, a relatively high number successive future user actions may be represented in a memory if the time required for the server computer to compress the video images is relatively low. And a relatively low number successive future user actions may be represented in a memory if the time required for the server computer to compress the video images is relatively high.

According to one embodiment, the predetermined number of successive future user actions is based at least in part on an amount of time required for the user device to decompress the video images. For example, a relatively high number successive future user actions may be represented in a memory if the time required for the client device to decompress the video images is relatively low. A relatively low number successive future user actions may be represented in a memory if the time required for the client device to decompress the video images is relatively high.

According to one embodiment, the predetermined number of successive future user actions is based at least in part on an amount of time required for the server computer to dynamically render the video images. For example, a relatively high number successive future user actions may be represented in a memory if the time required for the server computer to dynamically render the video images is relatively low. A relatively low number successive future user actions may be represented in a memory if the time required for the server computer to dynamically render the video images is relatively high.

Figure 5:
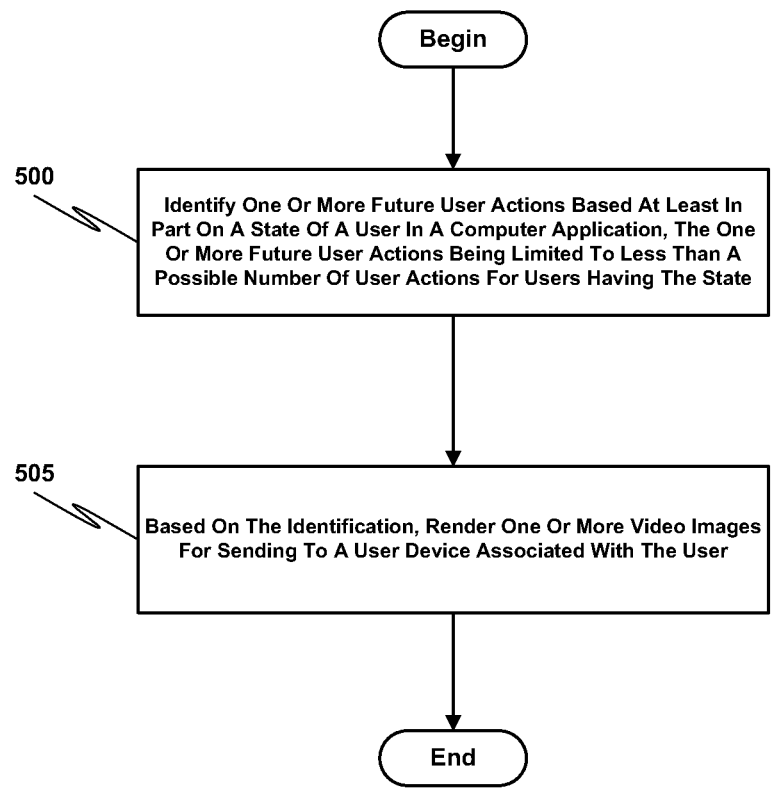
FIG. 5 is a flow diagram that illustrates a method for server side rendering from the perspective of a server in accordance with one embodiment.

FIG. 5 is a flow diagram that illustrates a method for server side rendering from the perspective of a server in accordance with one embodiment. The processes illustrated in FIG. 5 may be implemented in hardware, software, firmware, or a combination thereof. At 500, one or more future user actions are identified based at least in part on a state of a user in a computer application. At 505, based on the identification at 500, one or more video images are rendered for sending to a user device associated with the user. According to one embodiment, the one or more future user actions are limited to less than a possible number of user actions for users having the state.

Figure 6:
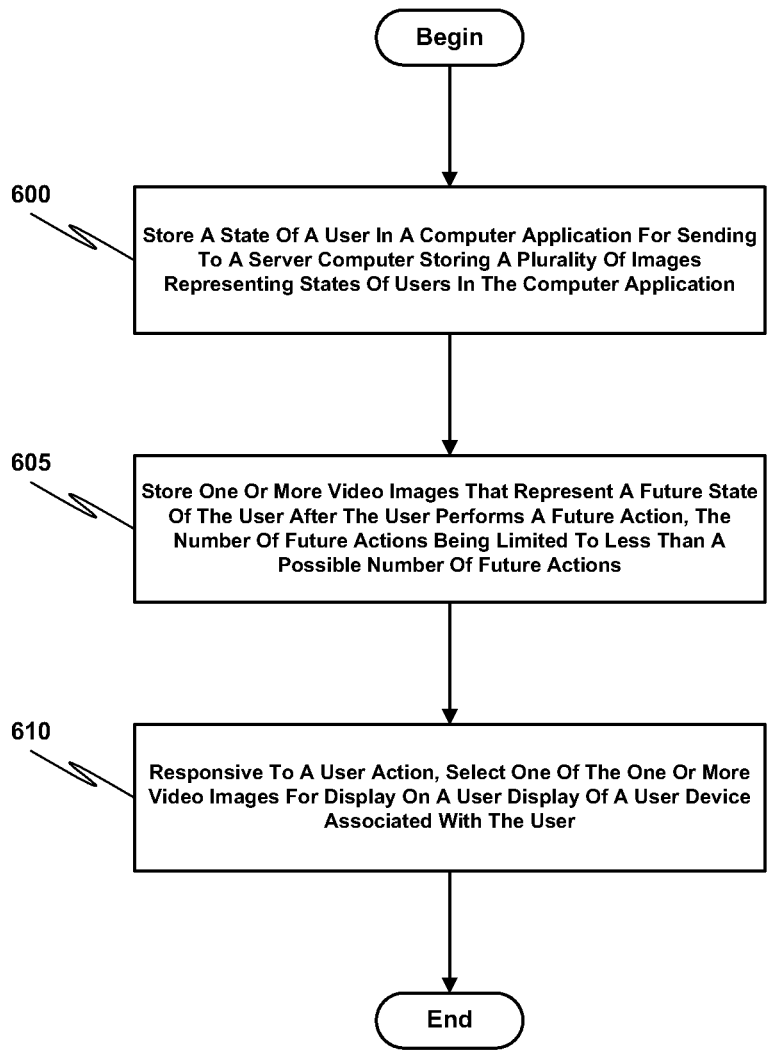
FIG. 6 is a flow diagram that illustrates a method for server side rendering from the perspective of a user device in accordance with one embodiment.

FIG. 6 is a flow diagram that illustrates a method for server side rendering from the perspective of a user device in accordance with one embodiment. The processes illustrated in FIG. 6 may be implemented in hardware, software, firmware, or a combination thereof. At 600, a state of a user in a computer application is stored for sending to a server computer storing a plurality of images representing states of users in the computer application. At 605, one or more video images that represent a future state of the user after the user performs a future action are stored. According to one embodiment, the number of future actions is limited to less than a possible number of future actions. At 610, responsive to a user action, one of the one or more video images is selected for display on a user display of a user device associated with the user.

Figure 7:
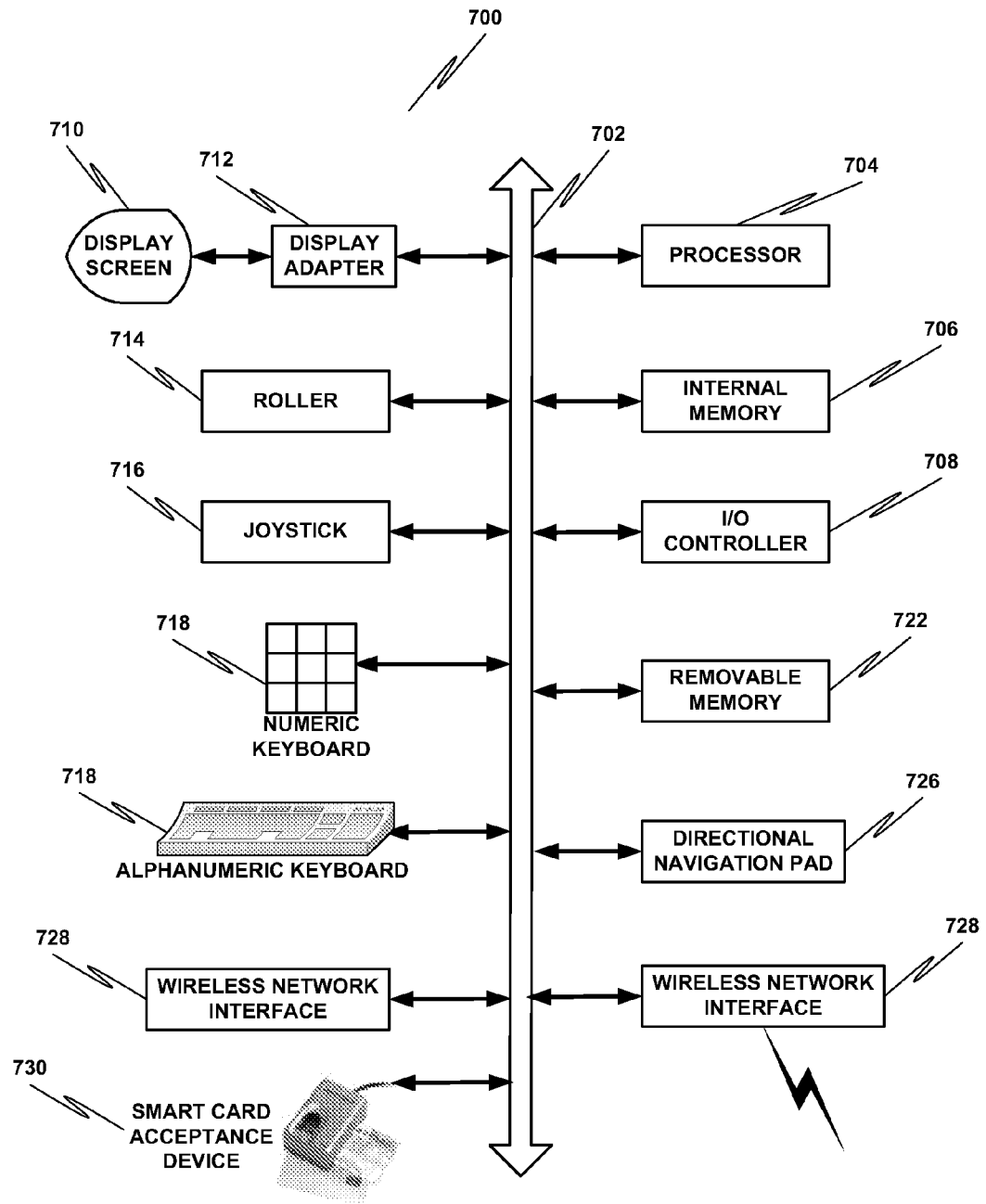
FIG. 7 is a block diagram of a computer system suitable for implementing aspects of the present disclosure.

FIG. 7 depicts a block diagram of a computer system 700 suitable for implementing aspects of the present invention. As shown in FIG. 7, system 700 includes a bus 702 which interconnects major subsystems such as a processor 704, an internal memory 706 (such as a RAM), an input/output (I/O) controller 708, a removable memory (such as a memory card) 722, an external device such as a display screen 710 via display adapter 712, a roller-type input device 714, a joystick 716, a numeric keyboard 718, an alphanumeric keyboard 718, directional navigation pad 726, smart card acceptance device 730, and a wireless interface 720. Many other devices can be connected. Wireless network interface 720, wired network interface 728, or both, may be used to interface to a local or wide area network (such as the Internet) using any network interface system known to those skilled in the art.

Many other devices or subsystems (not shown) may be connected in a similar manner. Also, it is not necessary for all of the devices shown in FIG. 7 to be present to practice the present invention. Furthermore, the devices and subsystems may be interconnected in different ways from that shown in FIG. 7. Code to implement the present invention may be operably disposed in internal memory 706 or stored on storage media such as removable memory 722, a floppy disk, a thumb drive, a CompactFlash® storage device, a DVD-R ("Digital Versatile Disc" or "Digital Video Disc" recordable), a DVD-ROM ("Digital Versatile Disc" or "Digital Video Disc" read-only memory), a CD-R (Compact Disc-Recordable), or a CD-ROM (Compact Disc read-only memory).

While embodiments of the present invention have been illustrated using examples from the illustrated character game, embodiments of the present invention apply to any online user application where states of a user are represented by video images. Such online user applications include online games.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer implemented method comprising:
   at a server computer configured to store a plurality of video images representing states of users in a computer application, identifying one or more future user actions based at least in part on a state of a user in the computer application; and
   responsive to the identifying, rendering one or more video images for sending to a user device associated with the user.

2. The method of claim 1 wherein the one or more future user actions are limited to less than a possible number of user actions for users having the state.

3. The method of claim 1 wherein the computer application comprises a computer game.

4. The method of claim 3 wherein the computer game comprises an online computer game.

5. The method of claim 1, further comprising compressing the one or more video images before the sending.

6. The method of claim 5 wherein the compressing comprises selecting an amount of compression based at least in part on a degree of network congestion between the server computer and the user device.

7. The method of claim 1 wherein the plurality of images represents states of users after each of a predetermined number of successive future user actions, the predetermined number being more than one.

8. The method of claim 7 wherein the predetermined number of successive future user actions is based at least in part on one of:
   a data store constraint of the server computer;
   a data store constraint of the user device;
   a network bandwidth constraint;
   an amount of time required for the server computer to dynamically render the one or more video images;
   an amount of time required for the server computer to compress the one or more video images; and
   an amount of time required for the user device to decompress the one or more video images.

9. The method of claim 1 the one or more future user actions is limited based at least in part on a probability of the one or more future user actions.

10. An apparatus comprising:
    a memory; and
    one or more processors configured to:

identify one or more future user actions based at least in part on a state of a user in a computer application; and responsive to the identification, render one or more video images for sending to a user device associated with the user.

11. The apparatus of claim 10 wherein the one or more future user actions are limited to less than a possible number of user actions for users having the state.

12. The apparatus of claim 10 wherein the computer application comprises a computer game.

13. The apparatus of claim 12 wherein the computer game comprises an online computer game.

14. The apparatus of claim 10 wherein the one or more processors are further configured to compress the one or more video images before the sending.

15. The apparatus of claim 14 wherein the compression comprises selecting an amount of compression based at least in part on a degree of network congestion between the apparatus and the user device.

16. The apparatus of claim 10 wherein the plurality of images represents states of users after each of a predetermined number of successive future user actions, the predetermined number being more than one.

17. The apparatus of claim 16 wherein the predetermined number of successive future user actions is based at least in part on one of:
   a data store constraint of the apparatus;
   a data store constraint of the user device;
   a network bandwidth constraint;
   an amount of time required for the server computer to dynamically render the one or more video images;
   an amount of time required for the apparatus to compress the one or more video images; and
   an amount of time required for the user device to decompress the one or more video images.

18. The apparatus of claim 10 the one or more future user actions is limited based at least in part on a probability of the one or more future user actions.

19. An apparatus comprising:
   means for, at a server computer configured to store a plurality of video images representing states of users in a computer application, identifying one or more future user actions based at least in part on a state of a user in the computer application; and
   means for, responsive to the identifying, rendering one or more video images for sending to a user device associated with the user.

20. A program storage device readable by a machine, embodying a program of instructions executable by the machine to perform a method, the method comprising:
   at a server computer configured to store a plurality of video images representing states of users in a computer application, identifying one or more future user actions based at least in part on a state of a user in the computer application; and
   responsive to the identifying, rendering one or more video images for sending to a user device associated with the user.

21. A computer implemented method comprising:
   at a user device associated with a user, storing a state of the user in a computer application, the state for sending to a server computer storing a plurality of images representing states of users in the computer application;
   responsive to the sending, storing one or more video images, each of the one or more video images representing a future state of the user after the user performs a future action; and
   responsive to a user action, selecting one of the one or more video images for display on a user display associated with the user device.

22. The method of claim 21 wherein a number of future actions is limited to less than a possible number of future user actions.

23. The method of claim 21, further comprising storing an indication of the user action for sending to the server computer.

24. The method of claim 21 wherein the computer application comprises a computer game.

25. The method of claim 24 wherein the computer game comprises an online computer game.

26. The method of claim 21 wherein the storing one or more images further comprises decompressing the one or more images before display on the user display.

27. The method of claim 26 wherein the decompressing is based at least in part on a degree of network congestion between the server computer and the user device.

28. The method of claim 21 wherein the one or more video images represents states of users after each of a predetermined number of successive future user actions, the predetermined number being more than one.

29. The method of claim 28 wherein the predetermined number of successive future user actions is based at least in part on one of:
   a data store constraint of the server computer;
   a data store constraint of the user device;
   a network bandwidth constraint;
   an amount of time required for the server computer to dynamically render the one or more video images;
   an amount of time required for the server computer to compress the one or more video images; and
   an amount of time required for the user device to decompress the one or more video images.

30. The method of claim 21 the number of future user actions is limited based at least in part on a probability of the future user actions.

31. An apparatus comprising:
   a memory; and
   one or more processors configured to:
      at a user device associated with a user, store a state of the user in a computer application, the state for sending to a server computer storing a plurality of images representing states of users in the computer application;
      responsive to the sending, store one or more video images, each of the one or more video images representing a future state of the user after the user performs a future action; and
      responsive to a user action, select one of the one or more video images for display on a user display associated with the user device.

32. The apparatus of claim 31 wherein a number of future actions is limited to less than a possible number of future user actions.

33. The apparatus of claim 31, further comprising storing an indication of the user action for sending to the server computer.

34. The apparatus of claim 31 wherein the computer application comprises a computer game.

35. The apparatus of claim 34 wherein the computer game comprises an online computer game.

36. The apparatus of claim 31 wherein the storing one or more images further comprises decompressing the one or more images before display on the user display.

37. The apparatus of claim 36 wherein the decompressing is based at least in part on a degree of network congestion between the server computer and the user device.

38. The apparatus of claim 31 wherein the one or more video images represents states of users after each of a predetermined number of successive future user actions, the predetermined number being more than one.

39. The apparatus of claim 38 wherein the predetermined number of successive future user actions is based at least in part on one of:
- a data store constraint of the server computer;
- a data store constraint of the user device;
- a network bandwidth constraint;
- an amount of time required for the server computer to dynamically render the one or more video images;
- an amount of time required for the server computer to compress the one or more video images; and
- an amount of time required for the user device to decompress the one or more video images.

40. The apparatus of claim 31 the number of future user actions is limited based at least in part on a probability of the future user actions.

41. An apparatus comprising:
- means for, at a user device associated with a user, storing a state of the user in a computer application, the state for sending to a server computer storing a plurality of images representing states of users in the computer application;
- means for, responsive to the sending, storing one or more video images, each of the one or more video images representing a future state of the user after the user performs a future action; and
- means for, responsive to a user action, selecting one of the one or more video images for display on a user display associated with the user device.

42. A program storage device readable by a machine, embodying a program of instructions executable by the machine to perform a method, the method comprising:
- at a user device associated with a user, storing a state of the user in a computer application, the state for sending to a server computer storing a plurality of images representing states of users in the computer application;
- responsive to the sending, storing one or more video images, each of the one or more video images representing a future state of the user after the user performs a future action; and
- responsive to a user action, selecting one of the one or more video images for display on a user display associated with the user device.

* * * * *